United States Patent [19]

Dawson

[11] Patent Number: 5,082,579
[45] Date of Patent: Jan. 21, 1992

[54] METHOD AND COMPOSITION FOR DELAYING THE GELLATION OF BORATED GALACTOMANNANS

[75] Inventor: Jeffrey C. Dawson, Katy, Tex.

[73] Assignee: BJ Services Company, Houston, Tex.

[21] Appl. No.: 465,903

[22] Filed: Jan. 16, 1990

[51] Int. Cl.$^5$ .............................. E21B 43/26
[52] U.S. Cl. ................. 252/8.551; 252/315.3
[58] Field of Search ............... 252/8.551, 315.3

[56] References Cited

U.S. PATENT DOCUMENTS

| | | | |
|---|---|---|---|
| 2,879,268 | 3/1959 | Jullander | 260/232 |
| 3,527,751 | 9/1970 | Gill | 106/197.1 X |
| 3,898,165 | 8/1975 | Ely et al. | 252/8.551 |
| 3,960,736 | 6/1976 | Free et al. | 252/8.551 |
| 3,974,077 | 8/1976 | Free | 252/8.551 |
| 4,040,967 | 8/1977 | Nimerick et al. | 252/8.551 |
| 4,244,826 | 1/1991 | Swanson . | |
| 4,336,145 | 6/1982 | Briscoe . | |
| 4,350,601 | 9/1982 | Mosier et al. . | |
| 4,371,443 | 2/1983 | Keeney . | |
| 4,373,959 | 2/1983 | Socha | 106/197.1 X |
| 4,514,309 | 4/1985 | Wadhwa . | |
| 4,579,670 | 4/1986 | Payne . | |
| 4,619,776 | 10/1986 | Mondshine . | |

FOREIGN PATENT DOCUMENTS 1095513 2/1981 Canada .
1547030 6/1979 United Kingdom .

Primary Examiner—Robert L. Stoll
Assistant Examiner—Gary L. Geist
Attorney, Agent, or Firm—Charles D. Gunter, Jr.

[57] ABSTRACT

A complexor and method of use are shown for providing controlled delay of the cross-linking reaction in an aqueous well fracturing fluid. A base fluid is first prepared by blending together an aqueous fluid and a hydratable polymer which is capable of gelling in the presence of borate ions. The complexor is prepared by mixing a cross-linking additive capable of furnishing borate ions in solution with a delay additive, such as glyoxal. The delay additive is effective, within a selected pH range, to chemically bond with both boric acid and the borate ions produced by the cross-linking additive to theeby limit the number of borate ions initially available in solution for subsequent cross-linking of the hydratable polysaccharide. The subsequent rate of cross-linking of the polysaccharide can be controlled by adjusting the pH of the complexor solution.

6 Claims, No Drawings

METHOD AND COMPOSITION FOR DELAYING THE GELLATION OF BORATED GALACTOMANNANS

BACKGROUND OF THE INVENTION

1. Field of the Invention:

The present invention relates to methods and compositions for controlling the gellation rate in an aqueous well fracturing fluid. It particularly relates to a novel liquid complexor used to obtain controlled delayed gellation of borated polysaccharides.

2. Description of the Prior Art:

During hydraulic fracturing, a sand laden fluid is injected into a well bore under high pressure. Once the natural reservoir pressures are exceeded, the fracturing fluid initiates a fracture in the formation which generally continues to grow during pumping. The treatment design generally requires the fluid to reach maximum viscosity as it enters the fracture which affects the fracture length and width. This viscosity is normally obtained by the gellation of suitable polymers, such as a suitable polysaccharide. In recent years, gellation has been achieved by cross-linking these polymers with metal ions including aluminum, antimony, zirconium and titanium containing compounds including the so-called organotitanates. See, for instance, U.S. Pat. No. 4,514,309, issued Apr. 30, 1985, and assigned to the assignee of the present invention.

The viscous fracturing fluid being pumped usually encounters high shear in the pipe string during pumping from the surface to the fracture and after entering the fracture, flows at low shear. Recent investigations indicate that the high shear encountered in the pipe string causes extensive degradation of the cross-linked fracturing fluid. Also, high fluid viscosities cause excessive back or friction pressures, limiting the pumping rate, which also affects fracture geometry. These investigations have shown that by delaying the gellation for several minutes during most of the high shear, higher pump rates can be obtained and the fluid generally exhibits better stability. In the case of the metal ion cross-linking systems, the delay in gellation is normally achieved with a delaying additive that binds or chelates the metal ions in solution.

Recently, guar and guar derivaties cross-linked with borate ions have again become popular. In alkaline water having a pH greater than about 7.8, cross-linking of the guar polymer is essentially instantaneous. This action is probably due to the fact that borates easily and readily esterify with 1,2-cissoidial dialcohols or polyhydric alcohols, such as those found on the guar polymer. This esterification is readily reversible, especially at the elevated temperatures found in the well bore, so that free borate ion is always available. As a result, the delay of borate ion cross-linking systems is difficult to achieve.

Certain of the prior art borated guar systems have employed either slow dissolving metal oxides which slowly increase the fluid alkalinity, which in turn promotes cross-linking, or by using calcium borate salts having poor water solubility, relying upon the slow dissolution of borate ions for delay. In both cases, the delay action was based primarily on the slow dissolution of a solid in the aqueous fracturing fluid, resulting in poor control of the delay time and ultimate viscosity of the fluid. U.S. Pat. No. 4,619,776, issued Oct. 28, 1986, to Mondshine, is typical of the prior art in teaching the use of a sparingly soluble borate to achieve some degree of control over the crosslinking reaction.

A need exists for a composition and method for providing more precise control over the cross-linking reaction of a borated aqueous fracturing fluid.

A need also exists for such a composition and method which does not rely upon the slow dissolution of a solid as the basis of the delay mechanism.

A need also exists for such a method and composition which allows selective adjustment of the delay rate at a well site quickly and conveniently.

A need also exists for such a method and composition which provides a reverse reaction to reduce the viscosity of the fracturing fluid with time to facilitate the cleanup of the treatment from the well bore.

SUMMARY OF THE INVENTION

The cross-linking system of the invention utilizes a novel complexor solution to control the gellation rate of an aqueous fracturing fluid containing a hydrated polysaccharide polymer. The complexor solution comprises a cross-linking additive and a delay additive which controls the rate at which the cross-linking additive promotes gellation of the hydrated polymer, the control rate being a function of the pH of the complexor solution. Preferably, the cross-linking additive is a material which supplies free borate ions in solution and the delay additive is a material which attempts to bind chemically to the borate ions in solution, whereby the hydrated polymer is forced to compete with the delay additive for the free borate ions. Most preferably, the delay additive is selected from the group consisting of dialdehydes having about 1 to 4 carbon atoms, keto aldehydes having about 1 to 4 carbon atoms, hydroxyl aldehydes having about 1–4 carbon atoms, ortho substituted aromatic dialdehydes and ortho substituted aromatic hydroxyl aldehydes.

In the method of the invention, a hydratable polymer capable of gelling in the presence of borate ions is blended with an aqueous fluid to form a base fluid and the polymer is allowed to hydrate. A complexor solution is formed for the base fluid by combining a cross-linking additive capable of furnishing borate ions in solution with a delay additive, to chemically bond with both boric acid and the free borate ions produced by the cross-linking additive to thereby limit the number of borate ions available in solution for subsequent cross-linking of the hydrated polymer. The pH of the complexor solution is adjusted in order to control the rate of the subsequent cross-linking of the hydratable polymer. The complexor solution is then added to the base fluid to cross-link the hydrated polymer.

Additional objects, features, and advantages will be apparent in the written description which follows.

DETAILED DESCRIPTION OF THE INVENTION

The present invention provides a method for controlling the cross-linking reaction of an aqueous fracturing fluid in fracturing a subterranean formation. In order to practice the method, an aqueous (water or brine) based fracturing fluid is first prepared by blending a hydratable polymer into the base fluid. Any suitable mixing apparatus may be used for this procedure. In the case of batch mixing, the hydratable polymer and aqueous fluid are blended for a period of time which is sufficient to form a hydrated sol. Once the hydration of the polymer is complete, a predetermined quantity of complexor solution is added to the base fluid sufficient to achieve a desired cross-linking reaction time. The mixture is pumped into the well bore as the cross-linking reaction takes place.

Propping agents are typically added to the base fluid prior to the addition of the complexor. Propping agents include, for instance, quartz sand grains, glass and ceramic beads, walnut shell fragments, aluminum pellets, nylon pellets, and the like. The propping agents are normally used in concentrations between about 1 to 8 pounds per gallon of fracturing fluid composition, but higher or lower concentrations can be used as required The base fluid can also contain other conventional additives common to the well services industry such as surfactants, corrosion inhibitors, buffers, and the like.

The hydratable polymer useful in the present invention can be any of the hydratable polysaccharides familiar to those in the well service industry which is capable of gelling in the presence of borate ions to form a gelled base fluid. For instance, suitable hydratable polysaccharides are the galactomannan gums, glucomannan gums, guars, derived guars and cellulose derivatives. Specific examples are guar gum, guar gum derivatives, locust bean gum, karaya gum, carboxymethyl cellulose, carboxymethylhydroxyethyl cellulose, and hydroxyethyl cellulose. The preferred gelling agents are guar gum, hydroxypropyl guar, carboxymethylhydroxypropyl guar, and carboxymethylhydroxyethyl cellulose. A suitable synthetic polymer is polyvinyl alcohol. The most preferred hydratable polymers for the present invention are guar gum and hydroxypropyl guar.

The hydratable polymer is added to the aqueous base fluid in concentrations ranging from about 0.10% to 5.0% by weight of the aqueous fluid. The most preferred range for the present invention is about 0.24% to 0.72% by weight.

The cross-linking system of the invention utilizes a novel complexor solution to control the cross-linking rate of the base fluid containing the hydrated polymer. The complexor solution comprises a cross-linking additive and a delay additive which controls the rate at which the crosslinking additive promotes gellation of the hydrated polymer, the control rate being a function of the pH of the complexor solution. Preferably, the cross-linking additive is a material which supplies borate ions in solution. Thus, the cross-linking additive can be any convenient source of borate ions, for instance the alkali metal and the alkaline earth metal borates and boric acid. A preferred crosslinking additive is sodium borate decahydrate. The crosslinking additive is preferably present in the range from about 5 to 25 % by weight, most preferably about 10 to 15 % by weight of the complexor solution.

The delay additive used in the complexor solution is a material which attempts to bind chemically to the borate ions produced by the cross-linking additive in solution, whereby the hydrated polymer is forced to compete with the delay additive for the borate ions. As will be explained, the effectiveness of the delay additive in chemically bonding to the borate ions in the complexor solution is pH dependent. Thus, unlike the prior art systems which utilized slow dissolving metal oxides or calcium borate salts having poor water solubility, the present complexor does not rely upon the slow dissolution of solids.

Preferably, the delay additive is selected from the group consisting of dialdehydes having about 2-4 carbon atoms, keto aldehydes having about 3-4 carbon atoms, hydroxy aldehydes having about 2 to 4 carbon atoms, ortho substituted aromatic dialdehydes and ortho substituted aromatic hydroxyl aldehydes. Preferred delay additives include, for instance, glyoxal, propane dialdehyde, 2-keto propanal, 1,4-butanedial, 2-keto butanal, 2,3-di keto dibutanal, phthaldehyde, salicaldehyde, etc. The preferred delay additive is glyoxal due to its ready availability from a number of commercial sources. Preferably, the delay additive is present in the range from about 5 to 40 % by weight, most preferably about 15 to 30 % by weight of the complexor solution. The preferred ratio of glyoxal to sodium borate is from about 1:0.1 to 1:1, and most preferably is about 1:0.516.

Glyoxal, a 1,2- dialdehyde, hydrates to form 1,1,2,2-tetrahydroxyethane which favorably binds to the borate ions provided by the cross-linking additive of the complexor. As the pH of the complexor solution increases, the rate of gellation declines. As the pH of the complexor solution decreases, the rate of gellation increases. Thus, by adjusting the pH of the complexor solution within a preselected range, extremely accurate control of the crosslinking delay time can be achieved. Experimental delay times have ranged from 10 to 300 seconds by varying the pH of the complexor solution from about 5.0 to 11.50, respectively.

The complexor can also contain a stabilizer which increases the shelf life of the complexor and can serve to enhance the delay time. Suitable stabilizers include, for instance, polyhydric alcohols such as pentaerythritol, glycerin, lanolin, mono and oligosaccharides having multiple hydroxyl groups, and the like. The preferred stabilizer is sorbitol, a reduced sugar. The stabilizer is preferably present in the range from about 5 to 20 % by weight, most preferably about 8 to 10% by weight of the complexor solution.

The complexor mixture is heated to a temperature ranging from ambient to 105.C for 1 to 5 hours. Most preferably heating should range from 65-80° C. for 2 to 4 hours.

The complexor of the invention can be used to control the delay time of a cross-linked fracturing fluid being pumped into a well bore traversing the subterranean formation to be fractured. The fracturing fluid is pumped at a rate sufficient to fracture the formation and to place propping agents into the fracture. A typical fracturing treatment would be conducted by hydrating a 0.24 to 0.72% galactomannan based polymer, such as a guar, in a 2% (wt/vol) KCl solution at a pH ranging from about 5.0 to 8.5. The pH of the complexor would be adjusted with caustic prior to the treatment to provide the desired delay time. During actual pumping, a buffer would be added to increase the hydrated polymer pH to above 8.0, followed by addition of the complexor, and typically a breaker and proppant. During the treatment, the area close to the well bore will typically begin cooling gradually, resulting in a decreasing gellation rate. The delay time can be easily readjusted to accommodate the cooling by acidifying the complexor.

In addition to a precisely controlled delay, the novel complexor of the invention provides another useful function. After the fracture is formed and the pumping is terminated, the viscosity of the fluid must be reduced below about 10 centipoise. At this viscosity, the fluid can be recovered while leaving the proppant in the fracture. As previously discussed, borate cross-linked galactomannans are pH dependent, requiring an alkaline base fluid having a pH above about 7.8. Glyoxal, in alkaline water, slowly converts to alpha-hydroxy acetic acid, a strong acid, which decreases the pH of the hydrated polymer gel with time. This in turn reduces the amount of available borate ion, since the borate ion is converted to boric acid which does not cross-link, and thus reduces the viscosity of the fracturing fluid.

The following examples of the cross-linked fracturing fluid of the present invention embodying the novel complexor discussed above are intended to serve primarily for the purpose of illustration. The invention, in its broader aspects, is not to be construed as limited thereto. Included are examples of glyoxal/borate formulation, data relating gellation times to complexor pH and gellation stability after cross-linking.

EXAMPLE 1

Complexor Preparation:

Into 300 parts of 40% aqueous glyoxal are added, with stirring, 130 parts of sodium borate decahydrate yielding a milky white suspension. Then, 65 parts of 25% aqueous sodium hydroxide are slowly added resulting in a clear, pale yellow solution. The solution pH can range from 4.90 to 6.50. Afterward, 71.4 parts of 70% aqueous sorbitol are added to the solution followed by heating to 95 C for 3 hours. During heating, the solution color changes from pale yellow to amber. After cooling to ambient, the solution pH ranges between 4.50 and 5.00.

EXAMPLE 2

Gellation Rate:

The base sol used to determine the gellation rate is prepared by adding, with vigorous stirring, 2.4 parts of a 0.4 D.S. hydroxypropyl guar gum and 0.18 parts of sodium bicarbonate to 500 parts of 2% aqueous potassium chloride solution. After the addition, the stirring rate is reduced to provide mild agitation to the sol for 2 hr. Then, 3.2 parts of 30% aqueous potassium carbonate are added which buffers the sol to about pH 10.0.

Meanwhile, the complexor prepared in Example 1 is blended with 0,4,8 and 12 parts of 25% aq sodium hydroxide per 100 parts of complexor. The pHs of the treated complexors are shown in Table 1.

Then, 250 parts of hydrated sol are transferred to a one liter Waring blender jar and sheared at a rate sufficient to create a vortex exposing the hub nut on the blender blades. Next, 0.98 parts of the treated complexors are added to the sol vortex. The time required for the fluid to viscosify and cover the hub nut is defined as the vortex closure time. These data are also shown in Table 1.

TABLE 1

| Parts of 25% aq NaOH per 100 parts complexor | Vortex Closure Time (sec.) | Complexor pH |
|---|---|---|
| 0 | 22 | 4.92 |
| 4 | 44 | 5.80 |
| 8 | 121 | 6.09 |
| 12 | 275 | 8.28 |

EXAMPLE 3

Shear and thermal stability of borated galactomannans:

The preparation of the base sol used in this example is mixed as described in Example 2. After hydrating for 2 hours, the 500 parts of base sol are treated with 4.5 parts of 30% aqueous potassium carbonate which buffers the sol to about pH 10.3. Afterward, 2.28 parts of complexor containing 0.17 parts of 25% aqueous sodium hydroxide are added to the vigorously stirring sol. After 100 seconds, 42 parts of gel are syringed into a Fann 50C cup. The sample is sheared at 102 sec$^{-1}$, using an RIBI cup and bob combination, while heating to 190 F in a preset bath and pressuring to 110 psi with nitrogen. The sample is heated and sheared for 20 minutes followed by a rate sweep using 170, 128, 85 and 42 sec$^{-1}$ while recording stress. These sweeps are repeated about every 30 minutes and the interim rate between sweeps is 102 sec$^{-1}$. After 359 minutes, the shearing is stopped while heating continues overnight. A final sweep is made after 22 hours and 21 minutes. The rates and stresses are used to calculate the Power Law indices, n' and K, described in the API bulletin RP-39. From the calculated indices, the viscosity of the gel at various shear rates can be calculated and are shown in Table 2 at 170 and 85 sec$^{-1}$ over time.

TABLE 2

| Time (min) | Temp °F. | n' | K lb$_m$/ft$_2$ | Viscosity(cp) at 170 s$^{-1}$ | 85 s$^{-1}$ |
|---|---|---|---|---|---|
| 20 | 183 | 0.7005 | 0.0497 | 512 | 630 |
| 51 | 191 | 0.7090 | 0.0420 | 451 | 552 |
| 81 | 191 | 0.6631 | 0.0456 | 387 | 489 |
| 112 | 192 | 0.8411 | 0.0144 | 306 | 341 |
| 141 | 192 | 1.0762 | 0.0040 | 286 | 271 |
| 172 | 190 | 1.1220 | 0.0028 | 252 | 231 |
| 202 | 191 | 1.1981 | 0.0016 | 210 | 183 |
| 232 | 191 | 1.1293 | 0.0020 | 185 | 169 |
| 262 | 192 | 1.1020 | 0.0022 | 181 | 169 |
| 292 | 192 | 1.0589 | 0.0025 | 160 | 155 |
| 359 | 193 | 0.9811 | 0.0020 | 86 | 87 |
| 1341 | 192 | 0.5486 | 0.0034 | 16 | 20 |

EXAMPLE 5

Shear and thermal stability of borated galactomannans:

The experiment in Example 3 is repeated using 4.0 parts 30% aqueous potassium carbonate and 1.62 parts of untreated complexor prepared in Example 1. After 60 seconds, 42 parts of gel are syringed into the Fann 50C cup. The fluid is sheared at 102 sec$^{-1}$ while heating to 160° F. in a preset bath and pressuring to 110 psi with nitrogen. The rate sweeps are conducted as described in Example 3. After 233 minutes of heating and shearing, the shearing is stopped while heating overnight continues. A final sweep is made after heating for 19 hours and 40 minutes. These data are shown in Table 3.

TABLE 3

| Time (min) | Temp °F. | n' | K lb$_m$/ft$_2$ | Viscosity(cp) at 170 s$^{-1}$ | 85 s$^{-1}$ |
|---|---|---|---|---|---|
| 20 | 160 | 0.4708 | 0.1844 | 583 | 841 |
| 51 | 164 | 0.4824 | 0.1530 | 513 | 735 |
| 80 | 163 | 0.5501 | 0.1038 | 493 | 674 |
| 111 | 163 | 0.5143 | 0.1143 | 452 | 632 |
| 141 | 164 | 0.5275 | 0.1047 | 443 | 614 |
| 171 | 163 | 0.5224 | 0.1044 | 430 | 599 |
| 203 | 163 | 0.6097 | 0.0625 | 403 | 529 |
| 233 | 162 | 0.6572 | 0.0419 | 345 | 437 |
| 1180 | 163 | 0.7992 | 0.0011 | 19 | 21 |

EXAMPLE 5

Shear and thermal stability of borated galactomannans:

The polymer used in Examples 3 and 4 is a hydroxypropyl guar gum. The polymer used in this example is 3.0 parts of a nonderivatized guar gum in 500 parts of 2% aqueous potassium chloride solution mixed as described in Example 2. The sol is stirred for 2 hours prior to adding 4.5 parts of 30% aqueous potassium carbonate and 1.12 parts of triethanolamine, a temperature stabilizer Then with vigorous stirring, 1.30 parts of untreated complexor prepared in Example 1 are added. After 60 sec$^{-1}$ of shear, 42 parts of gel are syringed into a Fann 50C cup. The gel is then sheared at 102 sec$^{-1}$ while heating to 245° F. in a preset bath and pressuring to 110 psi with nitrogen. The rate sweeps are routinely made as described in Example 3. The final sweep is made after shearing and heating for 149 minutes. These data are shown in Table 4.

TABLE 4

| Time (min) | Temp °F. | n' | K lb$_m$/ft$_2$ | Viscosity(cp) at 170 s$^{-1}$ | 85 s$^{-1}$ |
|---|---|---|---|---|---|
| 20 | 239 | 0.4516 | 0.1763 | 505 | 738 |
| 50 | 244 | 0.7736 | 0.0298 | 446 | 521 |
| 83 | 245 | 1.1109 | 0.0046 | 389 | 360 |
| 119 | 245 | 1.3101 | 0.0008 | 194 | 157 |
| 149 | 245 | 1.3858 | 0.0003 | 102 | 78 |

An invention has been shown with several advantages. The cross-linking system of the present invention provides an increase in viscosity in an aqueous well fracturing fluid by a method which is simple and economical. The crosslinking system provides a fracturing fluid which is shear stable at normal fracturing pump rates. The delayed borate cross-linking of the hydrated polymer occurs without the use of suspended solids. Because the delay mechanism does not rely upon the dissolution of solids in solution, the delay time can be precisely adjusted. Since the rate of crosslinking is a function of the pH of the complexor, the rate can be adjusted while the job is running at the well site by the addition of caustic or acid to the complexor solution. Because glyoxal, in alkaline water, slowly converts to an acid, it serves to decrease the pH of the polymer gel with time, thereby decreasing the viscosity of the fluid for easier cleanup.

While the invention has been shown in only one of its forms, it is not thus limited but is susceptible to various changes and modifications without departing from the spirit thereof.

What is claimed is:

1. A method of controlling the cross-linking reaction of an aqueous fracturing fluid in fracturing a subterranean formation, comprising the steps of:

blending together an aqueous fluid and a hydratable polymer capable of gelling in the presence of borate ions;

allowing the polymer to hydrate to form a hydrated polymer sol;

adding an alkaline buffer to thereby adjust the pH of the hydrated polymer sol in the range from about 8.0 to 11.5;

forming a complexor solution for said hydrated polymer gel by combining a cross-linking additive capable of furnishing borate ions in solution with a delay additive selected from the group consisting of dialdehydes having about 2–4 carbon atoms, keto aldehydes having about 3–4 carbon atoms hydroxyl aldehydes having 2–4 carbon atoms, ortho substituted aromatic dialdehydes and ortho substituted aromatic hydroxyl aldehydes, the delay additive being effective, to chemically bond wit the borate ions and boric acid produced by the cross-linking additive to thereby limit the number of borate ions available in solution for subsequent cross-linking of the hydrated polymer sol;

adjusting the pH o the complexor solution to achieve a desired delay in the cross-linking reaction of the hydrated polymer gel, the delay achieved being a function of the complexor solution pH, wherein upward adjustment of the pH of the complexor solution serves to retard the rate of the subsequent cross-linking of the hydrated polymer sol while downward adjustment of the pH of the complexor solution serves to accelerate the rate of subsequent cross-linking; and adding the complexor solution to the hydrated polymer sol to cross-link the hydrated polymer sol.

2. A method of controlling the cross-linking reaction of an aqueous fracturing fluid in fracturing a subterranean formation, comprising the steps of:

blending together an aqueous fluid and a hydratable polymer capable of gelling in the presence of borate ions;

allowing the polymer to hydrate to form a hydrated polymer sol;

forming a liquid complexor solution for the hydrated polymer sol by combining a cross-linking additive capable of furnishing borate ions in solution with a delay additive, the delay additive being effective, to chemically bond with both boric acid and the borate ions produced by the cross-linking additive to thereby limit the number of borate ions available in solution for subsequent cross-linking of the hydrated polymer sol;

adjusting the pH of the complexor solution in order to control the rate of the subsequent cross-linking of the hydrated polymer sol wherein upward adjustment of the pH of the complexor solution serves to retard the rate of the subsequent cross-linking of the hydrated polymer sol while downward adjustment of the pH of the complexor solution serves to accelerate the rate of subsequent cross-linking; and adding the complexor solution to the hydrated polymer sol to cross-link the hydrated polymer sol.

3. The method of controlling the cross-linking reaction of an aqueous fracturing fluid of claim 2, wherein the hydratable polymer is selected from the group consisting of:

guars and derivatized guars, locust bean gum, karaya gum, carboxymethyl cellulose, carboxymethylhydroxyethyl cellulose, hydroxyethyl cellulose, polyvinyl alcohol and mixtures thereof.

4. The method of controlling the cross-linking reaction of an aqueous fracturing fluid of claim 3, wherein the cross-linking additive is selected from the group consisting of:

alkali metal borates, alkaline earth metal borates, boric acid and mixtures thereof.

5. The method of controlling the cross-linking reaction of an aqueous fracturing fluid of claim 4, wherein said delay additive is selected from the group consisting of:

dialdehydes having about 2–4 carbon atoms, keto aldehydes having about 3–4 carbon atoms, hydroxyl aldehydes having 2–4 carbon atoms, ortho substituted aromatic dialdehydes, and ortho substituted aromatic hydroxyl aldehydes.

6. The method of controlling the cross-linking reaction of an aqueous fracturing fluid of claim 5, wherein the delay additive is glyoxal.

* * * * *